(12) United States Patent
Blekkenhorst et al.

(10) Patent No.: US 9,452,551 B2
(45) Date of Patent: Sep. 27, 2016

(54) PELLETIZING DEVICE WITH COMPLEMENTARY ROLLERS AND ROLLERS FOR THE DEVICE

(71) Applicant: CPM Europe B.V., Amsterdam (NL)

(72) Inventors: Nick Blekkenhorst, Amsterdam (NL); Menno Groenendaal, Amsterdam-Zuid-Oost (NL)

(73) Assignee: CPM EUROPE B.V., Amsterdam (NL)

( * ) Notice: Subject to any disclaimer, the term of this patent is extended or adjusted under 35 U.S.C. 154(b) by 0 days.

(21) Appl. No.: 14/593,713

(22) Filed: Jan. 9, 2015

(65) Prior Publication Data
US 2015/0190946 A1 Jul. 9, 2015

(30) Foreign Application Priority Data
Jan. 9, 2014 (NL) ..................................... 2012065

(51) Int. Cl.
| | | |
|---|---|---|
| *B29B 9/00* | (2006.01) | |
| *B29B 9/12* | (2006.01) | |
| *B01J 2/20* | (2006.01) | |
| *B29L 31/00* | (2006.01) | |
| *B30B 11/20* | (2006.01) | |
| *B29B 9/10* | (2006.01) | |
| *B29B 9/06* | (2006.01) | |

(52) U.S. Cl.
CPC .. *B29B 9/12* (2013.01); *B01J 2/20* (2013.01); *B29B 9/06* (2013.01); *B29B 9/10* (2013.01); *B29L 2031/772* (2013.01); *B30B 11/201* (2013.01); *B30B 11/208* (2013.01)

(58) Field of Classification Search
CPC ............. B29B 9/06; B29B 9/08; B29B 9/10; B30B 11/201; B30B 11/208; B01J 2/20
USPC .......................................................... 425/331
See application file for complete search history.

(56) References Cited

U.S. PATENT DOCUMENTS

| | | | | |
|---|---|---|---|---|
| 4,983,343 A * | 1/1991 | Lund | ..................... | B30B 11/202 |
| | | | | 264/142 |
| 5,198,233 A * | 3/1993 | Kaiser | ........................ | B01J 2/20 |
| | | | | 425/183 |
| 6,299,430 B1 | 10/2001 | Wallace | | |
| 6,375,447 B1 * | 4/2002 | Zitron | ........................ | B01J 2/20 |
| | | | | 425/331 |
| 2013/0084349 A1 * | 4/2013 | Walker | .................. | B30B 11/202 |
| | | | | 425/331 |

FOREIGN PATENT DOCUMENTS

EP 0363975 4/1990

* cited by examiner

*Primary Examiner* — James Mackey
(74) *Attorney, Agent, or Firm* — Peacock Myers, P.C.; Jeffrey Myers

(57) ABSTRACT

A pelletizing device comprising a die with a first surface, called operative surface, and a second surface that is essentially parallel to the first surface, the die between the first and the second surface comprising multiple through going openings for the forming of pellets, at least two rollers rotatable around a shaft, wherein the rollers and the die are moveable with respect to each other, each of the rollers comprising an operative pressing surface for pressing material to be pelletized through the radial openings of the die, wherein a width of the operative pressing surface on each of the rollers is smaller than a width of the operative surface of the die. The invention also relates to rollers for the device.

8 Claims, 2 Drawing Sheets

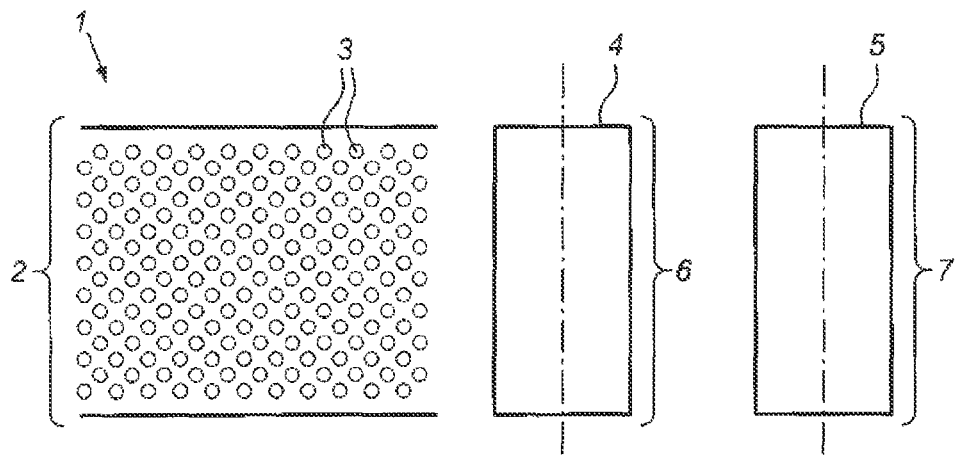
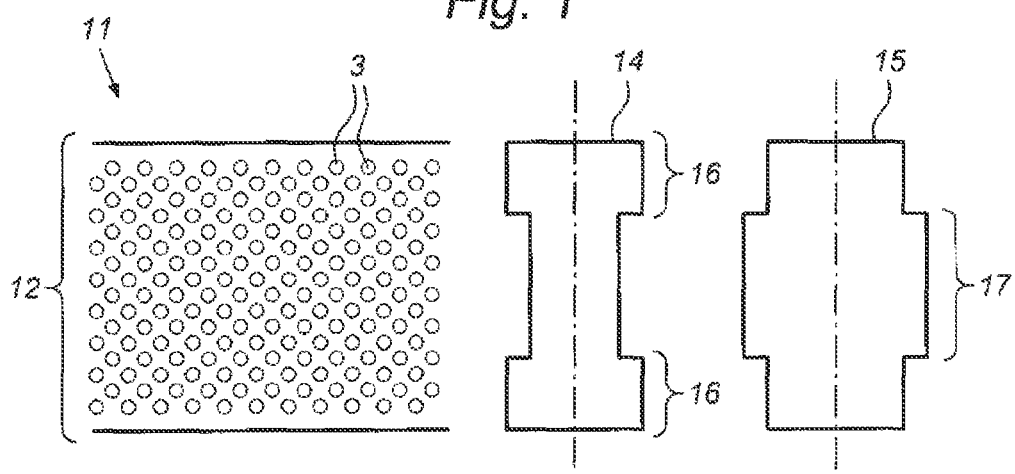
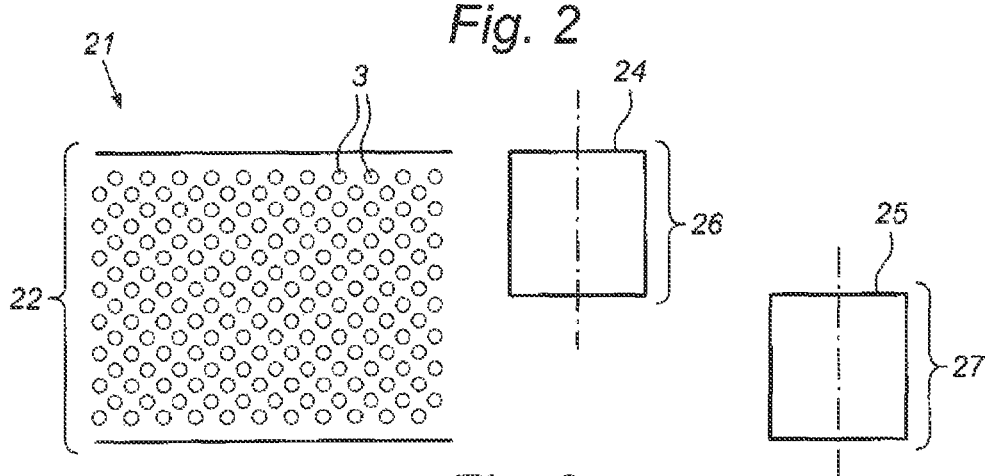

US 9,452,551 B2

PELLETIZING DEVICE WITH COMPLEMENTARY ROLLERS AND ROLLERS FOR THE DEVICE

CROSS-REFERENCE TO RELATED APPLICATIONS

This application claims priority to and the benefit of the filing of Netherlands Patent Application No. 2012065, filed on Jan. 9, 2014, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to a pelletizing device comprising a die with a first surface, called operative surface, and a second surface that is essentially parallel to the first surface, the die between the first and the second surface comprising multiple through going openings for the forming of pellets, at least two rollers rotatable around a shaft, wherein the rollers and the die are moveable with respect to each other, each of the rollers comprising an operative pressing surface for pressing material to be pelletized through the radial openings of the die. The invention also relates to rollers for the device.

2. Description of Related Art

In many industries products are offered in pellet form. These pellets have the form of large grains or small rods and are produced from originally fine grained material. This material in pellet form can easily be handled, be stored, be packaged and transported. Examples of pellets can be found in the cattle food industry, the recycling industry, but also plastics industry and biomass industry.

For example in wood industry sawdust and/or wood chips are being pressed to pellets, that then easily can be packaged and transported, but also properly metered can be fed to for instance incinerators and boilers.

The forming of pellets takes place in pelletizing devices. Pelletizing devices exist in different designs. Generally all designs comprise a die with a first surface, called operative surface, and a second surface that is essentially parallel to the first surface. The die comprises multiple through going openings for the forming of pellets between the first and the second surface. The pelletizing devices also comprise at least one roller rotatable around a shaft, wherein the rollers and the die are moveable with respect to each other, each of the rollers comprising an operative pressing surface for pressing material to be pelletized through the radial openings of the die. Pelletizing devices exist with a flat operative surface of the die and other devices have a cylindrical operative surface of the die. The roller(s) and die are moveable with respect to each other such that the roller(s) are rolling with their operative pressing surfaces over the operative die surface to press the material to be pelletized, that has been placed on the operative die surface, through the through going openings in the die and thus creating the pellets. The rollers may be driven to roll over the die, but also the rollers may be not-driven but the die is moved under the rollers or a combined driven movement is possible. The width of the operative pressing surface each roller is equal to or slightly larger than the width of the operative surface of the die. The roller is situated at a predefined minimal distance of the inside of the die and between the roller and the die the material to be pelletized is being compressed into the radial openings in the die. If the die is driven, the roller need not to be driven separately but gets into rotation by the rotation of the die and the material to be pelletized that is situated between the die and the roller. It is also possible to have the rollers rotating and the die stationary. During the pressing of pellets large forces are being generated. To generate these forces, the die or rollers are being driven with considerable power.

Within the principles described above there are still quite some variants possible in the design of the pelletizing devices. For instance a design variant can be found in the number of rollers used. One possibility is to have just one roller. However most commonly today machines are found with two or more rollers. This is mainly due to the large forces that are generated during the pressing of pellets as mentioned before. These forces are acting on the roller and in case of one roller the construction to keep this roller stable under these large forces can become complicated, heavy and above all costly. When two rollers are being used the construction to keep the rollers in a stable position becomes far easier. Also the same goes for three or more rollers possibly to a somewhat lesser extent.

BRIEF SUMMARY OF THE INVENTION

It is an aim of the present invention to provide a pelletizing device that can operate with increased efficiency.

This aim is being reached by a pelletizing device according to claim 1. Experiments have shown that a pelletizing device according to the invention utilizes up to 10% less energy as compared to a conventional pelletizing device for producing the same result in the same time, i.e. having the same throughput per unit of time and producing pellets of the same quality. This reduced energy consumption is not only a straightforward cost advantage. It opens opportunities for making a variety of design optimizations in pelletizing machines that cannot be realized in pelletizing machines according to the state of the art. This is due to the fact that the energy consumption is clearly one of the most important limiting factors in the design of pelletizing devices. Energy consumption directly translates into heat generated by the process. This again determines the operative temperature of some essential parts which in turn has a large influence on the life time of various parts. This is particularly true for material to be pelletized with a high viscosity such as wood chips. In such machines it is according to the invention e.g. possible to enlarge the width of the operative surface of the die and thus increase the productivity of the machine and to improve the life of essential wear parts. This usually can take place without changing the other dimensions of the machine.

In a pelletizing device according to claim 1 of the present invention, the operative pressing surface of each of the rollers is arranged in such a way, that it covers a part of the operative surface of the die that is not covered by any of the other rollers. From the experiments it is clear that the percentage of the operative surface of the die that is rolled over by an operative pressing surface of more than one roller is inversely proportional to the reduction in power consumption that is obtained by the invention.

In a preferred embodiment of the invention, the pelletizing device is arranged such that a relative movement between die and rollers is driven in a repetitive pattern and the operative pressing surface of each of the rollers has been laid out such that during a cycle of the repetitive pattern at least 90% of the operative surface of the die is being overrolled only once by an operative pressing surface of a roller. In this embodiment of the invention almost the full possible increase in efficiency is realized. This condition can be fulfilled by rollers of the same length that are covering the full width of the operative die surface, but where the operative pressing surface of each roller covers a different part of the width of the roller and hence for each roller this operative surface is operative on a different part of the operative surface of the die. In this case it should be clear that the operative pressing surface of a roller may comprise several parts that are spaced apart. The alternative is to utilize smaller rollers that relative to each other are being offset in the axial direction of the roller in such a way that again each operative pressing surface of each roller operates on a different part of the operative surface of the die but the operative pressing surface on the roller itself covers essentially the full length of the roller.

The percentage of the operative surface of the die that is rolled over by an operative pressing surface of two rollers should be kept to a minimum to obtain the full benefit of the reduction in power consumption by the pelletizing device according to the invention. Ideally this surface area should be zero however in practice this may be difficult if not in certain cases even impossible. It is important that each of the radial openings is fully overrolled, at least by one of the rollers. This is because if a roller only overrolls part of the opening then the material to be pelletized is not being pressed through the opening in a proper way, but instead the material can easily escape because one part of the opening is being left free and hence the pressure that is necessary to push the material through the opening is being relaxed in the free part of the opening.

In cases where the through going openings in the die have been arranged such that the these openings are aligned in non-overlapping rows in the direction of the relative movement between die and rollers, it is rather straightforward to dimension the operative pressing surface of the rollers in such a way that all through going openings are always fully overrolled and always by the same roller. However when such alignment does not exist in a die, a practical optimum is being reached in a pelletizing device according to claim 3 such that the areas of the cylindrical die surface containing the radial openings that are being overrolled more than once per revolution are sections with a width that at least is the center to the center distance of two adjacent radial openings measured in a direction perpendicular to the relative movement of die and rollers. That way it can be insured that all radial openings are fully overrolled at least once per revolution of the die and only very few through going openings are only partly overrolled by one of the rollers which will require some energy, but not very much.

In another preferred embodiment of the invention, the operative die surface comprises two or more spaced areas of which the boundaries essentially run in the direction of the relative movement. This allows the pelletizing device to be arranged such that the operative pressing surfaces of the rollers in their contact with the die are having a small overlap only in the space between the two or more areas of the operative surface of the die and thus realizing the full potential of the reduced energy consumption.

Operative surfaces of rollers often comprise a specific surface structure to control the material during pressing of the material through the radial openings in the die. The surface structure notably reduces the sideways movement of the material away from the radial openings and improves grip. In a preferred embodiment such a surface structure comprises a pattern of parallel grooves. To increase the homogeneity of pellets, in pelletizing devices with two or more rollers according to the state of the art, each roller comprises an operative surface with a pattern that differs from the pattern of the other rollers. That way each time one of the rollers passes the radial opening, the material to be pelletized is pressed in a somewhat different way regarding, e.g., distribution of the pressure exerted on the material to be pelletized. This advantage of a pelletizing device with two or more rollers in the case of the device according to the state of the art, can also be included in a pelletizing device according to the invention by providing the operative surface on each of the rollers with surface structure, e.g., a pattern of mutually parallel grooves, however the surface structure is varying over the surface for instance in the embodiment of mutually parallel grooves, orientation of the grooves varies. In other words it is possible to for instance divide the circumference of the rollers in sections and change the orientation of the grooves of the grooved pattern of the operative surface in each of the sections. That way the same advantage is being achieved as with more rollers but with a different orientation of the grooves in the operative surface.

A roller as specified in claim 8 is a roller that is to be used in a pelletizing device according to the invention. The roller comprises a center line, being the line around which a roller during use rotates. It is a roller with an operative pressing surface that is divided over at least two areas. Each of these areas is covering a portion of the center line of the roller, that is, a portion of the center line that is also a center line for that area. Two adjacent operative pressing surface areas are separated by a non-operative separation area also covering a portion of the center line of the roller. The total portion of the center line covered by the total operative pressing surface is less than 60% of the sum of the portions of the center line covered by all operative pressing surface areas and separation areas. In case that the area of a die to be overrolled is divided in two side areas and one middle area, the roller claimed in claim 8 is overrolling the two side areas. Obviously this roller is cooperating with a roller having one operative pressing surface area. However if the total area of the die to be covered is split in more areas than three, e.g., 5, then both rollers of a pelletizing device according to the invention are rollers according to claim 8.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 1 is schematic view of operative surface of die and two rollers according to the state of the art;

FIG. 2 is a schematic view of operative surface of die and two rollers in a further embodiment of a pelletizing device according to the invention;

FIG. 3 is a schematic view of an operative surface of a die and two rollers in a second embodiment of a pelletizing device according to the invention;

DETAILED DESCRIPTION OF THE INVENTION

Figure 4:
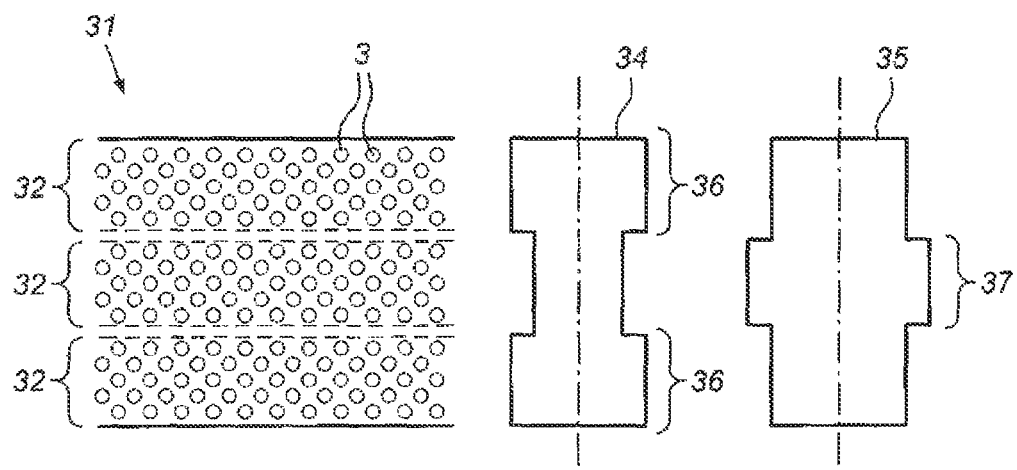
FIG. 4 is a schematic view of an operative surface of a die and two rollers in a third embodiment of a pelletizing device according to the invention.

Pelletizing devices exist in various shapes and forms and embodiments. They consist of a die, with an operative surface and a second surface essentially parallel to the operative surface wherein the operative surface comprises a multitude of through going openings that end at the other surface, as well as usually at least two rollers, each with an operative pressing surface that rolls over the operative surface of the die. Between die and rollers there is material to be pelletized that is pressed by the rollers when they roll over the die through the through going holes of the die and are coming out at the other end as pellet. Combinations of dies and rollers exist in a form of a cylindrical die and inside the cylindrical cavity the rollers are rolling over the cylindrical operative surface of the die. Another embodiment is a pelletizing device with an essentially flat die usually shaped as a ring or large washer where the rollers are rolling over the flat washer describing a circle of which the center point coincides with the center point of the washer like die. In the following examples are given of die and rollers according to the state of the art as well as die and rollers in two different embodiments according to the invention. In all cases the die is schematically shown as a straight flat surface but it should be kept in mind that this is only a schematic representation and it could equally well refer to a cylindrical die or a flat, washer like die as described above or a to any other die/roller arrangement of a pelletizing machine.

FIG. 1 shows die 1 with operative surface 2 of the die and on operative surface 2 a multitude of through going openings 3 that end in the opposite surface of the die 1 which is not shown. Also shown are two rollers 4, 5 with their respective operative surfaces 6, 7. Die 1 and rollers 4, 5 according to FIG. 1 represent a typical arrangement according to the state of the art. In FIG. 1 only part of a die 1 is shown and two rollers 4, 5 are shown but it could equally well relate to an arrangement where there are more than two rollers available. Rollers 4, 5 are making a movement with respect to die 1 in that they overroll die 1 in a repetitive relative movement of the 4, 5 rollers with respect to the die 1. The movement can be that the die 1 is driven and the rollers 4, 5 are stationary but are rolling over the surface of the die 1, or it can be that the die 1 is stationary and the rollers 4, 5 are driven and rolling over the surface of the die 1 or it could be a combination of these two. The rollers 4, 5 are rolling over an operative surface 2 of the die 1 and that on the operative surface 2 of the die 1 there is material to be pelletized (not shown in the figures) that is than being pressed by rollers 4, 5 through the through going openings 3 of the die 1 and the material comes out at the other side of the die 1 as pellets. This operation is taking place in a continuous movement of rollers 4, 5 over the operative surface 2 of die 1 and continuously new material to be pelletized is being fed on operative surface 2 of die 1. Also the movement of the rollers 4, 5 over die 1 is a repetitive movement. In the case of a cylindrical die that movement is repeated for each roller 4, 5 each time that roller has completed one pass/revolution over the inside of the cylinder that is formed by the die 1. In for instance the case of the flat washer type die 1, the movement of the rollers 4, 5 over die 1 is repeated again at each revolution but then the revolution is not around the cylinder but the revolution of the rollers around the center point of the washer like die 1 when the rollers have reached their starting position again.

The rollers 4, 5 of FIG. 1 according to the state of the art have an operative pressing surface 6, 7 respectively the width of which is equal to or slightly larger than the width of the operative surface 2 of the die 1. That means that during each revolution the operative surface 2 of the die 1 is overrolled twice, once by the operative surface 6 of roller 4 and the second time by the operative surface 7 of roller 5.

FIG. 2 is a schematic view of an operative surface 12 of a die 11 and two rollers 14, 15 in a first embodiment of a pelletizing device according to the invention. Die 11 of the pelletizing device according to the invention of FIG. 2 is similar to die 1 of the state of the art of FIG. 1. However rollers 14, 15 with their operative pressing surfaces 16, 17 respectively, are different in that the operative pressing surface 16 of roller 14 overrolls a different part of the operative surface 12 of die 11 than does operative surface 17 of roller 15. Thus in the pelletizing device according to the invention in this embodiment each part of the operative surface 12 of die 11 is overrolled only once by one of the operative pressing surfaces 16, 17 of rollers 14, 15 respectively, during one revolution of the relative repetitive movement. It is precisely this effect that brings about the reduction in consumption of energy of the pelletizing device according to the invention with respect to the pelletizing device according to the state of the art. It should be noted here that in the example given in FIG. 2 of an embodiment of a pelletizing device according to the invention a maximum possible saving in energy consumption is being reached in the fact that the full operative surface 12 of die 11 is overrolled only once during one cycle of the repetitive movement. In practice it may happen that the operative pressing surfaces 16, 17 of rollers 14, 15 are chosen such that the part of operative surfaces 12 of die 11 that they are overrolling are slightly overlapping. Benefits of the invention are obtained starting from the point where the overlap is less than 100%. The benefits are increasing with reducing overlap. Not in all cases will it be possible to reduce an overlap to 0%. With a linear relation between the benefit and the reduction in overlap, the benefit of the invention is substantial when the overlap falls below 70%. This may be the case where through going openings 13 in die 11 are arranged such that they are not aligned but that each row of openings is offset with respect to the next row. In that case it is necessary to have an overlap in such a way that at least all through going openings 3 of die 11 are fully overrolled by at least one of the operative pressing surfaces 16, 17 of rollers 14, 15 respectively. It should also be clear that also configurations that have a bigger overlap are still benefitting in that they still have reduced energy consumption and thus are still falling within the protection of the inventions as being defined by the claims.

FIG. 3 shows a schematic view of a second embodiment of a pelletizing device according to the invention. Die 21 with operative surface 22 and through-going openings 3 are similar to the dies 1, 11 of FIGS. 1 and 2. The rollers 24, 25 of the embodiment shown in FIG. 3 are different from the rollers 14, 15 shown in FIG. 2 in that the rollers 24, 25 are smaller but have an operative pressing surface 26, 27 respectively that covers more or less the full width of the roller 24, 25. The result is the same in that in principle each part of operative surface 22 of die 21 is overrolled only once by an operative pressing surface 26, 27 of rollers 24, 25 respectively during one cycle of the repetitive movement. If the arrangement of the through-going openings 3 in die 21 so requires, also rollers 24, 25 can be made to overlap in the area of the operative surface 22 that they both overroll.

Figure 5:
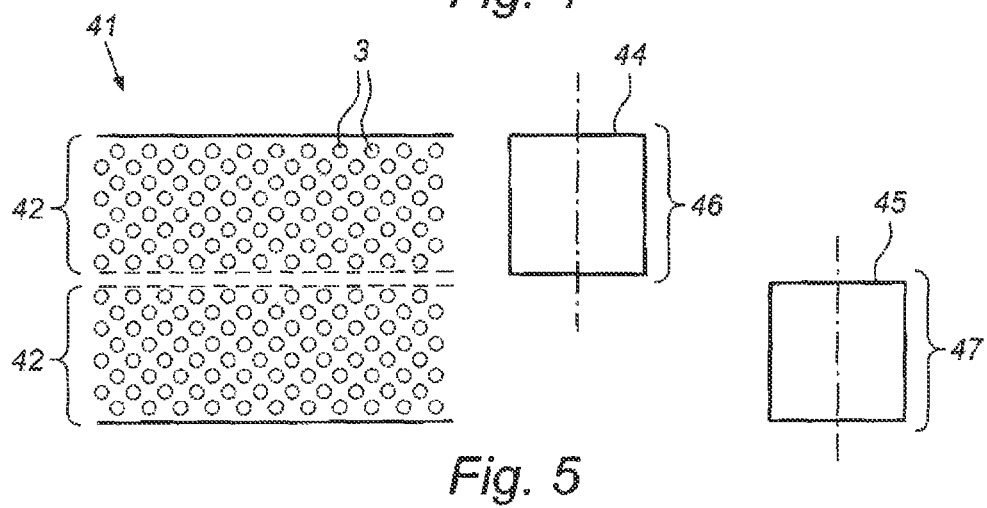
FIG. 5 is a schematic view of an operative surface of a die and two rollers in a fourth embodiment of a pelletizing device according to the invention.

FIGS. 4 and 5 are respectively showing third and fourth embodiments of pelletizing devices according to the invention wherein the rollers have similar shapes as the rollers of the first and second embodiment respectively shown in FIGS. 2 and 3, but the dies 31, 41 of the third and fourth embodiment as shown respectively in FIGS. 4 and 5 are different from the dies 11 and 21 respectively shown in FIGS. 2 and 3. The difference is found in that operative surface 32, 42 of dies 31, 41 are being split and separated by a small area that is not part of an operative surface. This small band of non-operative surface between two areas of the operative surface 32, 42 respectively of die 31, 41 is an area where the overlap takes place between the operative pressing surfaces 36, 37, 46, 47 of rollers 34, 35, 44, 45.

Figure 6:
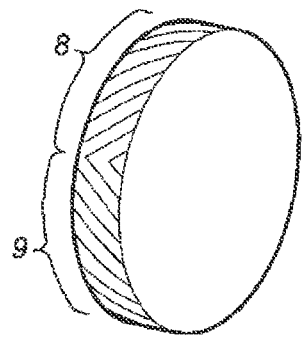
FIG. 6 is a schematic view in perspective of part of the circumference of a roller according to the invention.

FIG. 6 shows a part of a roller 14, 15, 24, 25, 34, 35, 44, 45 that carries the operative pressing surface 16, 17, 26, 27, 36, 37, 46, 47 according to the invention, in a view in perspective. Normally rollers of pelletizing devices do exhibit a rather specific surface structure on their operating pressing surface. The structure is designed to reduce sideways movement of the material away from the radial openings and improve the grip. To increase the homogeneity of the pellets, in pelletizing devices with two or more rollers according to the state of the art, each roller comprises an operative surface structure with a pattern that differs from the patterns of the other rollers, this to avoid "groove formation" and to increase homogeneity of the pellets produced. To get the same effect in pelletizing devices according to the invention, rollers of these devices have their operating pressing surface split in two or more areas in the rolling direction, the areas do have different surface structures. Preferably the areas are chosen such that with each successive repetitive movement each area of the operative surface of the die is overrolled by a different surface area of the roller than it was during the previous overrolling. In FIG. 6 two of such segments 8, 9 with surface structure have been shown. In the example shown the structure comprises a pattern of mutually parallel grooves, however the orientation of the grooves is differing from segment 8 to segment 9. In this way the same advantage is being achieved as with more rollers but each with a different surface structure of the operative pressing surface.

LIST OF REFERENCE NUMBERS

1, 11, 21, 31, 41 Die
2, 12, 22, 32, 42 Operative surface of die
3 Through going openings of die
4, 14, 24, 34, 44 Roller
5, 15, 25, 35, 45 Roller
6, 16, 26, 36, 46 Operative pressing surface of roller 4
7, 17, 27, 37, 47 Operative pressing surface of roller 5
8, 9 Segments of operative pressing surface Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A pelletizing device comprising:
    a die with a first surface and a second surface that is essentially parallel to the first surface, the die between the first and the second surface comprising multiple through going openings for the forming of pellets, wherein the part of the first surface that comprises the through going openings is defined as an operative surface; and
    at least two rollers rotatable around a shaft, wherein the rollers and the die are moveable relative to each other, each of the rollers comprising an operative pressing surface for pressing material to be pelletized through the through going openings of the die; and
    wherein a width of the operative pressing surface on each of the rollers is smaller than a width of the operative surface of the die; and
    wherein the device is arranged such that during operation a relative movement between the rollers and the die is driven such that the operative pressing surface of each of the rollers is rolling over the operative surface of the die; and
    wherein at least 30% of the operative surface of the die is being overrolled by the operative pressing surface of only one of the rollers.

2. The pelletizing device of claim 1, wherein at least 90% of the operative surface of the die is being overrolled by the operative pressing surface of only one of the rollers.

3. The pelletizing device of claim 1, wherein areas of the operative die surface that are being overrolled more than one of the rollers are areas with a width amounting to the center to center distance of two adjacent through going openings, measured in a direction perpendicular to the direction of the relative movement between the rollers and the die.

4. The pelletizing device of claim 1, wherein the operative die surface is distributed over a plurality of separate areas the boundaries of which are running essentially in the direction of the relative movement between the rollers and the die.

5. The pelletizing device of claim 1, wherein the operative pressing surface of each of the rollers is distributed over the circumference in areas having a different surface structure.

6. The pelletizing device of claim 5, wherein the areas having a different surface structure are areas comprising mutually parallel grooves the orientation of which differs between adjacent areas.

7. The pelletizing device of claim 5, wherein the areas having a different surface structure have been arranged such that at two successive overrollings each part of the operative die surface is overrolled by a different area.

8. A roller for a pelletizing device, the roller comprising a center line and an operative pressing surface covering at least a part of the center line of the roller, wherein the operative pressing surface is divided over at least two areas each covering a portion of the center line of the roller, wherein two adjacent operative pressing surface areas are separated by a non-operative separation area also covering a portion of the center line of the roller, and wherein a total portion of the center line covered by the total operative pressing surface is less than 60% of a sum of the portions of the center line covered by all operative pressing surface areas and separation areas.

\* \* \* \* \*